(12) United States Patent
Ochi et al.

(10) Patent No.: US 6,723,415 B2
(45) Date of Patent: Apr. 20, 2004

(54) MAGNETIC RECORDING MEDIUM

(75) Inventors: Muneyoshi Ochi, Ibaraki (JP); Takeki Mochizuki, Ibaraki (JP); Koh Tsukamoto, Ibaraki (JP)

(73) Assignee: Hitachi Maxell, Ltd,, Osaka (JP)

( * ) Notice: Subject to any disclaimer, the term of this patent is extended or adjusted under 35 U.S.C. 154(b) by 0 days.

(21) Appl. No.: 09/749,830

(22) Filed: Dec. 28, 2000

(65) Prior Publication Data

US 2001/0024741 A1 Sep. 27, 2001

(30) Foreign Application Priority Data

Dec. 28, 1999 (JP) .......................................... 11-372930

(51) Int. Cl.[7] ................................................ G11B 5/66
(52) U.S. Cl. ....................... 428/141; 428/212; 428/336; 428/694 BS; 428/694 BU; 428/694 BM; 428/694 SG; 428/425.9; 428/900
(58) Field of Search ................................ 428/212, 336, 428/694 BS, 694 SG, 694 BU, 694 BM, 425.9, 900, 141

(56) References Cited

U.S. PATENT DOCUMENTS

| | | | |
|---|---|---|---|
| 4,324,177 A | | 4/1982 | Tsuji et al. |
| 4,980,199 A | | 12/1990 | Okita et al. |
| 5,051,292 A | * | 9/1991 | Katoh et al. ................. 428/141 |
| 5,358,777 A | * | 10/1994 | Kojima ........................ 428/212 |
| 5,631,063 A | * | 5/1997 | Chujo et al. ................. 428/141 |
| 5,922,483 A | * | 7/1999 | Takahashi et al. ...... 428/694 B |
| 6,274,220 B1 | * | 8/2001 | Tsukuda et al. ............ 428/141 |
| 6,383,605 B1 | * | 5/2002 | Ejiri ............................ 428/141 |

FOREIGN PATENT DOCUMENTS

| | | |
|---|---|---|
| JP | B641297 | 10/1980 |
| JP | A5613515 | 2/1981 |
| JP | A62214514 | 9/1987 |
| JP | A63102024 | 5/1988 |
| JP | A1125715 | 5/1989 |
| JP | A2101624 | 4/1990 |
| JP | A2130718 | 5/1990 |
| JP | A317827 | 1/1991 |
| JP | A3216812 | 9/1991 |
| JP | A419815 | 1/1992 |
| JP | A-5234063 | 9/1993 |
| JP | A625702 | 1/1994 |
| JP | A6139553 | 5/1994 |
| JP | A830957 | 2/1996 |
| JP | A8235566 | 9/1996 |
| JP | A103647 | 6/1998 |

OTHER PUBLICATIONS

Standard ECMA (Standardizing Information and Communication Systems)—288, Jun. 1999, PP 29 and 30.

* cited by examiner

Primary Examiner—Leszek Kiliman
(74) Attorney, Agent, or Firm—Birch, Stewart, Kolasch & Birch, LLP

(57) ABSTRACT

A magnetic recording medium having a non-magnetic support, at least one primer layer on one surface of the support, a magnetic layer on the primer layer and a back coat layer on the other surface of the non-magnetic support, in which the support has a thickness of 2 to 5 $\mu$m, the surface roughness (Ra) of the support on its surface carrying the primer layer and the magnetic layer is from 2.5 nm to 20 nm, the thickness of the primer layer is 1.5 $\mu$m or less, and the primer layer contains 2 to 30 % by weight, based on the weight of all inorganic powder in the primer layer, of alumina powder having a particle size of 0.01 $\mu$m to 0.1 $\mu$m.

13 Claims, No Drawings

MAGNETIC RECORDING MEDIUM

BACKGROUND OF THE INVENTION

1. Field of the Invention

The present invention relates to a magnetic recording medium having a high recording capacity, a high access rate and a high transmission rate, in particular, a magnetic recording medium for data backup.

2. Prior Art

Magnetic tapes find various applications such as audio tapes, video tapes, computer tapes, etc. In particular, in the field of tapes for data backup, with the increase of the capacity of a hard disc which should be backed up, a tape having a memory capacity of several ten GB per one volume has been commercialized, and it is inevitable to increase the capacity of the backup tape to cope with the further increase of the capacity of the hard disc. Furthermore, it is necessary to increase a relative speed between the tape and a magnetic head to increase the access rate and the transmission rate.

With the magnetic tape which can cope with the increase of the memory capacity per one volume and the increase of the travelling speed of the tape and the relative speed between the tape and the magnetic head, it is necessary to improve the touch between the tape and the magnetic head through the optimization of the mechanical properties of a non-magnetic support, a primer layer and a magnetic layer as well as the increase of a recording density through the improvement of the magnetic layer with the increase of the magnetic properties and dispersion of a ferromagnetic powder and the increase of the memory capacity through the increase of the tape length per one volume with the reduction of the total thickness of the tape.

In connection with the improvement of the magnetic properties of the ferromagnetic powder, a ferromagnetic metal ion powder is mainly used in place of conventionally used metal oxide powders or cobalt-containing iron oxide powder, since the larger residual magnetization in the magnetic layer is more preferable for the increase of output. Thus, a ferromagnetic iron-based metal powder having a coercive force of 120 A/m (1,500 Oe) or more is proposed (for example, JP-A-6-25702, JP-A-6-139553, etc.)

To improve the dispersion of the ferromagnetic powder, it is proposed to use a binder having a polar functional group such as a sulfonic acid group, a phosphoric acid group or its alkali salt, to use a low molecular weight dispersant together with a binder, to continuously carry out kneading and dispersing steps of a magnetic paint, or to add a lubricant to a magnetic paint after dispersing (for example, JP-A-2-101624, JP-A-3-216812, JP-A-3-17827, JP-A-8-235566, etc.)

To improve the touch between the tape and the magnetic head so as to decrease spacing loss between them, it is proposed to smoothen the magnetic layer under conditions of a high temperature and a high pressure in a calendering step in addition to the increase of the dispersibility of the magnetic powder (for example, JP-B-1-1297, JP-B-7-60504, JP-A-4-19815, etc.)

In addition to the improvement of the properties of the magnetic layer, it is proposed to decrease the thickness of the magnetic layer to 0.6 μm or less with the provision of a primer layer between a non-magnetic support and the magnetic layer to make the structure of the magnetic recording medium suitable for sort wavelength-recording (JP-A-5-234063). Such a magnetic recording medium has the primer layer to decrease self-demagnetization loss and reproduction loss due to the reduction of the thickness of the magnetic layer and also to suppress the deterioration of the travelling property and durability of the magnetic recording media due to the reduction of the thickness of the magnetic layer.

On the other hand, with the recent development of recording systems, it is tried to further decrease the recording wavelength. For example, the latest digital data storage systems use the shortest recording wavelength of 0.5 μm or less. In general, as the thickness of the magnetic layer increases, the filling amount of the magnetic powder per unit area increases, and thus the output increases. However, when a ratio of the thickness of the magnetic layer to the wavelength exceeds a certain value, a demagnetizing field increases and thus the output does not further increase. Therefore, the thickness of the magnetic layer should be about one third (⅓) of the shortest recording wavelength. Accordingly, with the above-described latest recording systems, the thickness of the magnetic layer is reduced to 0.3 μm or less, and also the flatness of the surface of the magnetic layer should be improved.

In the case of the recording systems having the large capacity, the tape-travelling speed and the relative speed between the tape and the magnetic head tend to be further increased since it is necessary to increase the access rate and the transmission rate. When the tape-travelling speed and the relative speed between the tape and the magnetic head are increased, the touch between the magnetic head and the magnetic tape becomes unstable and the output fluctuates between the entrance and the exit of a track.

To improve the flatness of the magnetic layer corresponding to the reduction of the recording wavelength, it is necessary to use a non-magnetic support having high surface smoothness. However, the non-magnetic support having the high surface smoothness is very expensive and the travelling of the non-magnetic support becomes unstable since it slips or sticks to a roll when a coating layer such as the primer layer is formed. Therefore, the productivity of the magnetic recording media deteriorates.

When the thickness of the primer layer is decreased to 1.5 μm or less to decrease the total thickness of the magnetic recording medium, the flatness of the surface of the primer layer becomes insufficient. When the magnetic layer is formed on such a primer layer by a wet-on-wet method, minute unevenness is formed at the interface between the primer layer and the magnetic layer. Such unevenness not only adversely affect the writing and reading properties of the tape but also generates edge weave at tape edges when a raw sheet of magnetic tapes is slit in a specific width. The edge weave adversely affects the tracking of the magnetic head and thus cause the fluctuation of the output. This phenomenon is remarkable when the cheap non-magnetic support which has good travelling properties in the course of coating and low surface flatness.

Accordingly, when the non-magnetic support with low surface flatness is used, it is highly desired for magnetic recording tapes to cope with the decrease of the recording wavelength through the improvement of the flatness of the surface of a magnetic recording layer, and also to decrease the fluctuation of the output through the suppression of the edge weave at the tape edges and the fluctuation of the output of the magnetic head between the entrance and the exit of the track through the improvement of the touch between the magnetic head and the magnetic tape.

SUMMARY OF THE INVENTION

One object of the present invention is to provide a magnetic recording medium which increases the output and suppress the fluctuation of the output.

According to the present invention, there is provide a magnetic recording medium comprising a non-magnetic support, at least one primer layer on one surface of said non-magnetic support, a magnetic layer on said primer layer and a back coat layer on the other surface of said non-magnetic support, wherein said non-magnetic support has a thickness of 2 to 5 μm, the surface roughness (Ra) of said non-magnetic support on the surface carrying said primer layer and said magnetic layer is from 2.5 nm to 20 nm, the thickness of said primer layer is 1.5 μm or less, and said primer layer contains 2 to 30 wt. %, based on the weight of all inorganic powder in said primer layer, of alumina powder having a particle size of 0.01 μm to 0.1 μm.

In one preferred embodiment of the magnetic recording medium of the present invention, the non-magnetic support has a thickness of 2.5 to 4.5 μm, the primer layer has a thickness of 0.3 to 1.5 μm and a surface roughness (Ra) of 3 to 9 nm on its surface carrying the primer layer and the magnetic layer, the magnetic layer has a thickness of 0.02 to 0.3 μm, a coercive force of 135 to 280 kA/m and a residual magnetic flux density of at least 0.18 T in the machine direction, and the back coat layer has a thickness of 0.2 to 0.8 μm.

The present invention is based on the following findings:

When the primer layer contains the specific amount of alumina powder having a specific particle size, the produced magnetic recording medium has good short wavelength-recording characteristics and the fluctuation of the output caused by the edge weave is suppressed, even when the non-magnetic support has low surface flatness. This effect increases, when the alumina used has a specific crystalline structure.

In addition, when the Young's modulus in the machine direction of the non-magnetic support exceeds a specific value and the ratio of the Young's modulus in the machine direction to that in the transverse direction of the non-magnetic support is in a certain range, the fluctuation of the output between the entrance and the exit of the track can be decreased. Furthermore, when the Young's modulus of the non-magnetic support is in the specific range described above and the Young's modulus of the coated layers consisting of the primer layer and the magnetic layer is in the specific range, the touch between the magnetic recording medium and the magnetic head is further improved and thus the fluctuation of the output between the entrance and the exit of the track is further decreased.

DETAILED DESCRIPTION OF THE INVENTION

According to the present invention, the magnetic recording medium comprises the non-magnetic support having a low surface roughness (Ra) of from 2.5 nm to 20 nm, preferably from 2.5 nm to 15 nm, more preferably from 3 nm to 9 nm on the surface carrying the primer layer and magnetic layer, and the thickness of the primer layer is 1.5 μm or less. In such a case, the primer layer containing 2 to 30 wt. %, based on the weight of all the inorganic powder in the primer layer, of alumina powder having a particle size of 0.1 μm or less has low surface unevenness and thus the surface unevenness of the magnetic layer which is formed on the primer layer by the wet-on-wet method can decrease, since the flowability of the primer coating composition increases. As a result, the magnetic recording medium has the same short wavelength-recording characteristics as those of the magnetic recording media comprising the smooth non-magnetic support. Such effects are significant when the alumina contained in the primer layer comprises alumina having the corundum phase.

With the magnetic recording medium comprising the primer layer containing the alumina powder, the relationship of the Young's modulus in the machine direction of the non-magnetic support and the ratio of the Young's modulus in the machine direction to that in the transverse direction with the difference of the output of the magnetic head between the entrance and exit of the track is studied. When the Young's modulus in the machine direction of the non-magnetic support is at least 9.8 GPa (1,000 kg/mm$^2$) and the ratio of the Young's modulus in the machine direction to that in the transverse direction is in the range between 0.65 and 0.75, the touch between the magnetic recording medium and the magnetic head is improved and thus the fluctuation (flatness) of the output of the magnetic head between the entrance and exit of the track decreases.

Hereinafter, the non-magnetic support, the primer layer, the magnetic layer and the back coat layer will be explained.

Non-magnetic Support

In the present invention, the Young's modulus in the machine direction of the non-magnetic support is preferably at least 9.8 GPa (1,000 kg/mm$^2$), and the ratio of the Young's modulus in the machine direction to that in the transverse direction is preferably in the range between 0.65 and 0.75. More preferably, the Young's modulus in the machine direction of the non-magnetic support is at least 10.78 GPa (1,100 kg/mm$^2$), and the ratio of the Young's modulus in the machine direction to that in the transverse direction is in the range between 0.67 and 0.73.

When the Young's modulus in the machine direction of the non-magnetic support is less than 9.8 GPa, the travelling of the tape becomes unstable.

When the ratio of the Young's modulus in the machine direction to that in the transverse direction is outside the range of 0.65 to 0.75, the fluctuation of the output of the magnetic head between the entrance and the exit of the track may increase. This fluctuation is minimized when this ratio of the Young's modulus is around 0.70.

Examples of the non-magnetic support having the above properties include biaxially orientated films of aromatic polyamide and aromatic polyimide.

The thickness of the non-magnetic support depends on the application of the magnetic recording media. Usually, the thickness of the support is from 2 to 5 μm, preferably from 2.5 to 4.5 μm. When the thickness of the support is less than 2 μm, the production of the film is difficult and the tape has insufficient strength. When the thickness of the support exceeds 5 μm, the total thickness of the tape increases so that the memory capacity per one volume decreases.

The particle size of the alumina added to the primer layer is preferably 0.1 μm or less, and the amount of the alumina is preferably from 2 to 30 wt. % based on the weight of all the inorganic powder in the primer layer.

When the particle size of the alumina exceeds 0.1 μm, the effect of the alumina to improve the surface smoothness of the primer layer tends to decrease. The particle size of the alumina is preferably from 0.01 to 0.1 μm, more preferably from 0.03 to 0.09 μm, particularly preferably from 0.05 to 0.09 μm.

However, the above particle size does not exclude the addition of α-alumina having a particle size of 0.1 to 0.8 μm in an amount of less than 3 wt. % together with the alumina having the above specific particle size.

When the amount of the alumina added is less than 2 wt. %, the primer paint composition has insufficient flowability.

When the amount of the alumina added exceeds 30 wt. %, the unevenness of the surfaces of the primer layer and the magnetic layer increases. The amount of the alumina added is preferably from 6 to 25 wt. %, more preferably from 8 to 20 wt. %, particularly preferably from 11 to 20 wt. %.

The alumina added preferably comprises one having the corundum phase, since the Young's modulus of the primer layer can be increased and the strength of the tape is increased by the addition of the smaller amount than σ-, θ- or γ-alumina.

The surface roughness (Ra) of the surface of the support carrying the primer layer and the magnetic layer is preferably from 3 to 9 nm. When the surface roughness (Ra) is 9 nm or less, the unevenness of the surface of the primer layer or the magnetic layer can be small if the thickness of the primer layer is small.

When the primer layer contains the above-described amount of the alumina having the above particle size, the unevenness at the interface between the primer layer and the magnetic layer can be suppressed so that the fluctuation of the output due to the edge weave of the tape edges can be decreased. This effect can be enhanced when the alumina having the corundum phase is used. In addition, the tape strength is increased.

In addition to the above alumina powder, the primer layer may contain carbon black to increase the conductivity, or non-magnetic iron oxide powder to increase the strength of the tape.

Carbon black (CB) added to the primer layer may be acetylene black, furnace black, thermal black, etc. The carbon black has a particle size of 5 to 200 nm, preferably from 10 to 100 nm. When the particle size of CB is less than 10 nm, it is difficult to disperse CB in the primer paint composition since CB has a structure. When the particle size of CB exceeds 100 nm, the surface flatness of the primer layer or the magnetic layer deteriorates.

The amount of CB added depends on the particle size of the CB, and is preferably from 15 to 40 wt. % of the weight of all the inorganic powder in the primer layer When the amount of CB is less than 15 wt. %, the effect to increase the conductivity is insufficient. When the amount of CB exceeds 40 wt. %, the effect to increase the conductivity saturates.

Preferably, CB having a particle size of 15 to 80 nm is used in an amount of 15 to 35 wt. %, and more preferably, CB having a particle size of 20 to 50 nm is used in an amount of 20 to 30 wt. %.

The addition of CB having such a particle size can decrease the electric resistance of the primer layer so that the generation of the electrostatic noise and the variation of the tape travelling can be suppressed.

The non-magnetic iron oxide added to the primer layer preferably has a particle size of 0.05 to 0.40 μm, and the amount of the non-magnetic iron oxide is preferably from 35 to 83 wt. % of the weight of all the inorganic powder in the primer layer.

When the particle size of the non-magnetic iron oxide is less than 0.5 μm, it is difficult to disperse it uniformly. When the particle size exceeds 0.40 μm, the unevenness at the interface between the primer layer and the magnetic layer increases. When the amount of the non-magnetic iron oxide is less than 35 wt. %, the strength of the primer film may not be sufficiently increased. When the amount exceeds 83 wt. %, the strength of the primer film tends to decrease.

The Young's modulus of the coated layers consisting of the primer layer and the magnetic layer has an optimum range. When the Young's modulus of the coated layers is in the range between 40 and 100% of the average value of the Young's moduli in the machine and transverse directions of the non-magnetic support, the tape has improved durability, and the touch between the tape and the magnetic head is improved so that the fluctuation of the output of the magnetic head between the entrance and the exit of the track is decreased.

The Young's modulus of the coated layers is preferably in the range between 50 and 100%, more preferably in the range between 60 and 90% of the average value of the Young's moduli in the machine and transverse directions of the non-magnetic support.

When the Young's modulus of the coated layers is less than 40% of the average value of the Young's moduli in the machine and transverse directions of the non-magnetic support, the durability of the coated layers is not improved. When it exceeds 100%, the touch between the tape and the magnetic head may deteriorate.

In the present invention, the Young's modulus of the coated layers consisting of the primer layer and the magnetic layer is preferably controlled by the adjustment of the calendering conditions.

Furthermore, the Young's modulus of the primer layer is preferably from 80 to 99% of that of the magnetic layer, since the primer layer can act as a cushioning layer.

Preferably, the primer layer and the magnetic layer may contain lubricants having different functions.

When the primer layer contains 0.5 to 4.0 wt. % of a higher fatty acid and 0.2 to 3.0 wt. % of an ester of a higher fatty acid based on the weight of all the powder in the primer layer, the friction coefficient between the tape and a rotating cylinder decreases. When the amount of the higher fatty acid is less than 0.5 wt. %, the friction coefficient may not sufficiently decrease. When the amount of the higher fatty acid exceeds 4.0 wt. %, the primer layer is plasticized and thus loses toughness. When the amount of the ester of the higher fatty acid is less than 0.5 wt. %, the friction coefficient may not sufficiently decrease. When the amount of the ester exceeds 3.0 wt. %, the excessive amount of the ester is transferred to the magnetic layer so that the tape and the rotating cylinder tends to stick each other.

When the magnetic layer contains 0.5 to 3.0 wt. % of a fatty acid amide and 0.2 to 3.0 wt. % of an ester of a higher fatty acid, the friction coefficient between the tape and the rotating cylinder preferably decreases. When the amount of the fatty acid amide is less than 0.5 wt. %, the magnetic head and the magnetic layer tend to be in direct contact with each other so that the effect to prevent seizing decreases. When the amount of the fatty acid amid exceeds 3.0 wt. %, the acid amid bleeds out so that defects such as dropouts generate. When the amount of the higher fatty acid is less than 0.2 wt. %, the friction coefficient may not sufficiently decrease. When the amount of the higher fatty acid exceeds 3.0 wt. %, the tape and the rotating cylinder tends to stick each other.

In the present invention, the mutual migration of the lubricants between the primer layer and the magnetic layer is not excluded.

The thickness of the magnetic layer is preferably from 0.02 to 0.3 μm, preferably from 0.02 to 0.25 μm. When the thickness of the magnetic layer is less than 0.02 μm, the output of the magnetic head is low since the leaking magnetic field from the magnetic layer is small. When the thickness of the magnetic layer exceeds 0.3 μm, the output of the magnetic head decreases due to the thickness loss.

Preferably, the magnetic layer has a coercive force of 135 to 280 kA/m (1,700 to 3,500 Oe) in the machine direction and a residual magnetic flux density of at least 0.18 T (1,800 G) in the machine direction. When the coercive force is less than 135 kA/m, the output decreases due to the demagnetization field. When the coercive force exceeds 280 kA/m, it is difficult to write the magnetic recording medium with the magnetic head. When the residual magnetic flux density is less than 0.18 T, the output decreases. More preferably, the coercive force is from 160 to 240 kA/m (2,000 to 3,000 Oe), and the residual magnetic flux density is from 0.2 to 0.4 T (2,000 to 4,000 G).

The magnetic powder added to the magnetic layer is preferably ferromagnetic iron-based metal powder. The iron based metal is intended to mean not only metal iron powder but also metal powder of metal iron containing other ferromagnetic metal such as cobalt, nickel, rare earth metals, etc.

The ferromagnetic iron-based metal powder preferably has a coercive force of 135 to 280 kA/m (1,700 to 3,500 Oe) and a residual magnetic flux density of 120 to 200 $Am^2/kg$ (120 to 200 emu/g), more preferably 130 to 180 $Am^2/kg$ (130 to 180 emu/g).

The above coercive forces and residual magnetic flux densities of the magnetic layer and the ferromagnetic iron-based metal powder are measured using a sample vibration type magnetic flux meter in an external magnetic field of 1.28 MA/m (16 kOe).

The ferromagnetic iron-based metal powder used in the present invention preferably has an average major axis length of 0.03 to 0.2 μm, more preferably 0.03 to 0.18 μm, particularly preferably 0.04 to 0.15 μm. When the average major axis length is less than 0.03 μm, the agglomeration force of the magnetic powder increases and thus the dispersion of the powder in the coating paint becomes difficult. When the average major axis length exceeds 0.2 μm, the coercive force decreases and a particulate noise due to the size of the magnetic powder particle increases.

The above average major axis length is obtained by taking a photograph of the magnetic powder particles with a scanning electron microscope, measuring the major axis lengths of 100 particles, and then averaging the measured lengths.

The ferromagnetic iron-based metal powder preferably has a BET specific surface area of at least 35 $m^2/g$, more preferably at least 40 $m^2/g$, most preferably at least 50 $m^2/g$.

The primer layer and the magnetic layer usually contain a binder. Examples of the binder include combinations of a polyurethane resin with at least one other resin selected from the group consisting of vinyl chloride-base resins (e.g. a polyvinyl chloride resin, a vinyl chloride-vinyl acetate copolymer resin, a vinyl chloride-vinyl alcohol copolymer resin, a vinyl chloride-vinyl acetate-vinyl alcohol copolymer resin, a vinyl chloride-vinyl acetate-maleic anhydride copolymer resin, a vinyl chloride-hydroxyl group-containing alkyl acrylate copolymer resin, etc.) and nitocellulose. Among them, the combination of the polyurethane resin and the vinyl chloride-hydroxyl group containing alkyl acrylate copolymer resin is preferable. Examples of the polyurethane resin include polyester polyurethane, polyether polyurethane, polyetherpolyester polyuretahen, polycarbonate polyurethane, polyester-polycarbonate polyurethane, etc.

In particular, the primer layer and the magnetic layer preferably contain a polyurethane resins having a functional group as a binder. Examples of the functional group include —COOH, —$SO_3H$, —$OSO_2M$, —(P=O)—$(OM)_3$, —O—(P=O)—$(OM)_2$ (wherein M is a hydrogen atom, an alkali metal or an amine group), —OH, —$NR^1R^2$, —$N^+R^3R^4R^5$ (wherein each of $R^1$ to $R^5$ is a hydrogen atom or a hydrocarbon group) or an epoxy group. The polyurethane resin having such a functional group can improve the dispersion of the magnetic powder.

When two or more binder resins are used, they preferably have the functional groups having the same polarity, in particular, —$SO_3M$.

The amount of the binder is usually from 7 to 50 wt. parts, preferably from 10 to 35 wt. parts, based on 100 wt. parts of the ferromagnetic iron-based metal powder. In particular, 5 to 30 wt. parts of the vinyl chloride base resin and 2 to 30 wt. parts of the polyurethane resin are preferably used in combination.

It is preferable to use a thermosetting crosslinking agent, which crosslinks the binder with bonding the functional group in the binder, along with the binder. Examples of such a crosslinking agent include diisocyanates (e.g. tolylene diisocyanate, hexamethylene diisocyanate, isophorone diisocyanate, etc.), reaction products of such isocyanates with compounds having two or more hydroxyl groups (e.g. trimethylolpropane, etc.), condensation products of such isocyanates, and the like.

The crosslinking agent is used in an amount of 10 to 50 wt. parts, preferably 15 to 35 wt. parts, based on 100 wt. parts of the binder.

The magnetic layer may contain any conventional abrasive. The abrasive is preferably an inorganic material having Mohs hardness of at least 6. Examples of such an inorganic material include α-alumina, β-alumina, silicon carbide, chromium oxide, cerium oxide, α-iron oxide, corundum, artificial diamond, silicon nitride, titanium carbide, titanium oxide, silicon dioxide, boron nitride, etc. They may be used independently or as a mixture of two or more. Among them, alumina is preferable since it can exhibit good magnetic head-cleaning effects in a small amount.

The particle size of the abrasive depends on the thickness of the magnetic layer. The average particle size of the abrasive is preferably from 0.02 to 0.4 μm, more preferably from 0.03 to 0.3 μm.

The amount of the abrasive added is preferably from 5 to 20 wt. %, more preferably from 8 to 18 wt. %, based on the weight of the ferromagnetic iron-base metal powder.

In the present invention, the magnetic layer may contain carbon black to increase the conductivity and the surface lubrication. Examples of carbon black include acetylene black, furnace black, thermal black, etc.

The particle size of carbon black is preferably from 5 to 200 nm, more preferably from 10 to 100 nm. When the particle size of carbon black is less than 5 nm, it is difficult to disperse carbon black in the magnetic paint, while when the particle size exceeds 200 nm, a large amount of carbon black should be added. In either case, the surface roughness of the magnetic layer increases so that the output decreases.

The amount of carbon black is preferably from 0.2 to 5 wt. %, more preferably from 0.5 to 4 wt. % based on the ferromagnetic powder.

The back coat layer may be any one used in the conventional magnetic recording media to improve the travelling properties. Usually, the back coat layer has a thickness of 0.2 to 0.8 μm. When the thickness of the back coat layer is less than 0.2 μm, the travelling properties of the magnetic recording medium may not be sufficiently improved. When the thickness of the back coat layer exceeds 0.8 μm, the total thickness of the magnetic recording medium becomes too large so that the memory capacity per one volume decreases.

The back coat layer preferably contains carbon black. Examples of carbon black include acetylene black, furnace black, thermal black, etc.

Usually, carbon black having a smaller particle size and one having a larger particle size are used together. The carbon black having a smaller particle size has usually a particle size of 5 to 200 nm, preferably 10 to 100 nm. When this particle size is less than 5 nm, it is difficult to disperse carbon black in the back coat paint, while when the particle size exceeds 200 nm, a large amount of carbon black should be added. In either case, the surface roughness of the back coat layer increases to cause the embossing of the magnetic layer.

When the carbon black having a particle size of 300 to 400 nm is used in an amount of 5 to 15 wt. % of the carbon black having a smaller particle size, the surface roughness of the back coat layer is not increased and thus the travelling properties are improved.

The total amount of the carbon black having a smaller particle size and one having a larger particle size is preferably from 60 to 98 wt. %, more preferably from 70 to 95 wt. % based on the weight of all the inorganic powder in the back coat layer.

The back coat layer has preferably a surface roughness (Ra) of 3 to 8 nm, more preferably 4 to 7 nm.

The back coat layer preferably contains non-magnetic iron oxide having a particle size of 0.1 to 0.6 μm, more preferably 0.2 to 0.5 μm to increase the strength of the back coat layer.

The amount of the non-magnetic iron oxide is preferably from 2 to 40 wt. %, more preferably from 5 to 30 wt. % based on the weight of all the inorganic powder in the back coat layer.

A cassette tape containing the above magnetic tape installed therein has a large capacity per one volume, and high reliability as a magnetic recording tape for backing up a hard disc drive.

EXAMPLES

The present invention will illustrated by the following Examples, which do not limit the scope of the present invention in any way.

In the Examples, "parts" means "parts by weight".

Example 1

| | Parts |
|---|---|
| Components of primer paint | |
| (1) | |
| Non-magnetic iron oxide powder | 68 |
| (particle size: 0.11 μm × 0.02 μm) | |
| Alumina (Degree of alphatization: 50%, | 8 |
| Particle size: 0.07 μm) | |
| Carbon black (particle size: 25 nm) | 24 |
| Stearic acid | 2.0 |
| Vinyl chloride copolymer | 10 |
| ($SO_3Na$ group content: $0.7 \times 10^{-4}$ eq./g) | |
| Polyester polyurethane resin (Tg: 40°, | 4.5 |
| $SO_3Na$ group content: $1 \times 10^{-4}$ eq./g) | |
| Cyclohexanone | 25 |
| Methyl ethyl ketone | 40 |
| Toluene | 10 |
| (2) | |
| Butyl stearate | 1 |
| Cyclohexanone | 70 |
| Methyl ethyl ketone | 50 |
| Toluene | 20 |
| (3) | |
| Polyisocyanate | 4.5 |
| Cyclohexanone | 10 |
| Methyl ethyl ketone | 15 |
| Toluene | 10 |
| Components of magnetic paint | |
| (1) | |
| Ferromagnetic iron-base metal powder | 100 |
| (Co/Fe: 30 atomic %, Y/(Fe + Co): 3 atomic %, | |
| Al/(Fe + Co): 5 wt. %, Ca/Fe: 0, | |
| σs: 155 A · m²/kg, Hc: 188.2 kA/m, pH: 9.4, | |
| Major axis length: 0.10 μm) | |
| Vinyl chloride-hydroxypropyl acrylate copolymer | 11 |
| ($SO_3Na$ group content: $0.7 \times 10^{-4}$ eq./g) | |
| Polyester polyurethane resin | 5 |
| ($SO_3Na$ group content: $1.0 \times 10^{-4}$ eq./g) | |
| α-Alumina (Av. particle size: 0.2 μm) | 15 |
| Carbon black (Av. particle size: 75 nm, | 2.0 |
| DBP oil absorption: 72 cc/100 g) | |
| Methyl phosphate | 2 |
| Palmitic acid amide | 1.5 |
| n-Butyl stearate | 1.0 |
| Tetrahydrofuran | 65 |
| Methyl ethyl ketone | 245 |
| Toluene | 85 |
| (2) | |
| Polyisocyanate | 4 |
| Cyclohexanone | 167 |

The components (1) of the primer paint were kneaded with a kneader, and the components (2) of the primer paint were added and mixed. Then, the mixture was dispersed with a sand mill at a residence time of 60 minutes. To the dispersed mixture, the components (3) were added and stirred followed by filtration to obtain a primer paint.

Separately, the components (1) of the magnetic paint were kneaded with a kneader and the mixture was dispersed with a sand mill at a residence time of 45 minutes. The components (2) of the magnetic paint were added to the mixture and mixed, followed by filtration to obtain a magnetic paint.

The primer paint was applied on a support consisting of an aromatic polyamide film ("MICTRON" (trade name) of TORAY, Thickness: 3.9 μm, Young's modulus in machine direction (MD)=11 GPa, Young's modulus in MD/Young's modulus in transverse direction (TD)=0.70) in an amount such that the thickness after drying and calendering was 1.1 μm to for a primer layer. Then, on the formed primer layer, the above magnetic paint was applied in an amount such that the thickness after orientation in a magnetic field, drying and calendering was 0.2 μm, and orientated in a magnetic field and dried to form a magnetic layer.

The orientation in the magnetic field was carried out by placing a pair of N-N opposing magnets (5 kG) before the drier, and two pairs of N-N opposing magnets (each 5 kG) at positions which were 75 cm and 25 cm respectively, before a finger-touch dried position in the drier. The application rate was 100 m/min.

| Components of back coat paint | Parts |
|---|---|
| Carbon black (particle size: 25 nm) | 80 |
| Carbon black (particle size: 370 nm) | 10 |
| Non-magnetic iron oxide (particle size: 0.4 μm) | 10 |
| Nitrocellulose | 45 |
| Polyurethane resin (having SO$_3$Na groups) | 30 |
| Cyclohexanone | 260 |
| Methyl ethyl ketone | 525 |

The components of the back coat paint were dispersed in a sand mill at a residence time of 45 minutes. To the mixture, polyisocyanate (15 parts) was added and filtered to obtain a back coat paint. Then, the back coat paint was applied on the other surface of the polyamide film opposite to the magnetic layer so that the thickness after drying and calendering was 0.5 μm, and dried.

The magnetic sheet produced was planished with a seven-stage clalendering machine comprising metal rolls at a temperature of 100° C. and a linear pressure of 150 kg/cm. Then, the sheet was rolled around a core and aged at 70° C. for 2 hours.

Thereafter, the sheet was slit in a width of a digital audio tape (DAT) (3.8 mm), and the surface of the magnetic layer was post treated with lapping tape abrading, blade abrading and surface wiping at a travelling rate of 200 m/min. to obtain a magnetic tape. In the post-treatment, the "K 1000" lapping tape was used as the lapping tape, a carbide-tipped blade was used as the blade, and a cloth of TRAYSEE (trademark) was used to wipe the magnetic layer surface. The travelling tension was 30 g.

The magnetic tape produced was installed in a cartridge to obtain a tape for a computer.

Examples 2–14

A tape for a computer was produced in the same manner as in Example 1 except that some conditions were changed as shown in Table 1.

Examples 15–17

A tape for a computer was produced in the same manner as in Example 1 except that some conditions were changed as shown in Table 2.

The tapes were evaluated as follows:

Coating Property

In the unwinding-coating-winding process, the generation of troubles such as waving, winding corrugations, etc. was evaluated according to the following criteria:

A: Very good
B: Good
C: Fair
D: Bad

Surface Roughness of Support (Support Ra)

The surface roughness of the support was measured with a surface roughness meter (SE-3FA manufactured by KOSAKA KENKYUSHO).

The support was adhered to a semicylindrical glass having a smooth surface with allowing the surface of the support, on which the back coat layer would be formed, to face the glass surface. Then, the surface roughness of the support on which the magnetic layer would be formed was measured using a stylus with a tip radius of 5 μm at a magnification of 100,000 times in the vertical direction with a cut-off of 0.08 mm.

Young's Modulus of Support

A sample of the support of 10 mm in width and 150 mm in length was provided. Then, a load-elongation curve was recorded with an INSTRON type universal tensile meter, and a Young's modulus in MD ($Y_{MD}$, unit: GPa) and that in TD ($Y_{TD}$, unit GPa) were calculated.

The sample was pulled with a chuck distance of 100 mm at a pulling rate of 20 mm/min. and the Young's modulus was calculated from a load at 0.3% elongation in the recorded chart.

Young's Modulus of Magnetic Layer

A sample of the magnetic tape of 3.8 mm in width and 150 mm in length was provided, and a load-elongation curve was recorded and a Young's modulus was calculated in the same manner as in the measurement of the Young's modulus of the support.

Edge Weave

A tape of 450 mm in length was extended between a pair of guides with flanges under a tension of 0.05 (N), and the tape edge position was read from the above with an edge position sensor. The edge positions were read at an interval of 0.25 mm along 250 mm of the tape base edge. From the position data obtained in the first 50 mm length, a regression line was obtained. Then, the deviation of each position date from the regression line was measured to obtain the maximum deviation.

Next, the starting point was shifted by 0.25 mm, and the position data were read along the length of 50 mm in the same manner as above and the maximum deviation was obtained. These procedures were repeated, and the maximum deviations along the length of 250 mm were averaged and used as the measure of edge weave.

Flatness

A magnetic tape was recorded at a recording wavelength of 0.67 μm with a DDS-4 drive (manufactured by Hewlet-Packard), and the recorded signal was reproduced with the same drive. The outputs were recorded at 25 points from the entrance to the exit of each trace of an envelope waveform, and averaged to obtained the averaged output (AVR).

From the AVR, the maximum output (Max) and the minimum output (Min), a flatness was calculated according to the following equations:

$$\text{Maximum value (dB)} = 20 \times \log(\text{Max}/AVR)$$

$$\text{Minimum value (dB)} = 20 \times \log(\text{Min}/AVR)$$

$$\text{Flatness (dB)} = \text{Maximum value} - \text{Minimum value}$$

The results are shown in Table 1

TABLE 1

| Example No. | 1 | 2 | 3 | 4 |
|---|---|---|---|---|
| Support | Aramid | Aramid | Aramid | Aramid |
| Thickness (μm) | 3.9 | 3.9 | 3.9 | 3.9 |
| $Y_{MD}$ (GPa) | 11.0 | 11.3 | 10.6 | 11.0 |
| $Y_{TD}$ (GPa) | 15.5 | 15.0 | 16.3 | 15.5 |
| $Y_{MD}/Y_{TD}$ | 0.70 | 0.75 | 0.65 | 0.70 |
| $(Y_{MD} + Y_{TD})/2$ (GPa) | 13.3 | 13.2 | 13.5 | 13.3 |
| Support Ra (nm) | 6.0 | 6.0 | 6.0 | 2.5 |
| Powder in primer layer | | | | |
| AL1[1] (wt. %) | 8 | 8 | 8 | 8 |
| Crystal structure[2] | Cor. | Cor. | Cor. | Cor. |
| Percentage of alphatization (%) | 50 | 50 | 50 | 50 |
| AL2[3] (wt. %) | 0 | 0 | 0 | 0 |
| Carbon black (wt. %) | 24 | 24 | 24 | 24 |

TABLE 1-continued

| | | | | |
|---|---|---|---|---|
| Iron oxide (wt. %) | 68 | 68 | 68 | 68 |
| Linear pressure in calendering (N/cm) | 1470 | 1470 | 1470 | 1470 |
| t1[4] (μm) | 0.2 | 0.2 | 0.2 | 0.2 |
| t2[5] (μm) | 1.0 | 1.0 | 1.0 | 1.0 |
| BC[6] (μm) | 0.5 | 0.5 | 0.5 | 0.5 |
| Tape thickness (μm) | 5.6 | 5.6 | 5.6 | 5.6 |
| Coating property | A | A | A | B |
| Surface roughness (Ra) of magnetic layer (nm) | 2.2 | 1.9 | 2.0 | 1.7 |
| Ratio of Young' modulus[7] (%) | 11.0 | 12.5 | 11.0 | 11.0 |
| | 83 | 95 | 81 | 83 |
| Edge weave (μm) | 2.0 | 2.3 | 2.0 | 2.0 |
| Flatness (dB) | 1.2 | 1.9 | 1.7 | 1.4 |
| Output AVR (%) | 100 | 92 | 95 | 100 |

| Example No. | 5 | 6 | 7 | 8 |
|---|---|---|---|---|
| Support | Aramid | Aramid | Aramid | Aramid |
| Thickness (μm) | 3.6 | 3.9 | 3.9 | 3.9 |
| $Y_{MD}$ (GPa) | 11.0 | 11.3 | 11.0 | 11.3 |
| $Y_{TD}$ (GPa) | 15.5 | 15.0 | 15.1 | 15.5 |
| $Y_{MD}/Y_{TD}$ | 0.70 | 0.70 | 0.73 | 0.73 |
| $(Y_{MD} + Y_{TD})/2$ (GPa) | 13.3 | 13.2 | 13.1 | 13.3 |
| Support Ra (nm) | 6.0 | 6.0 | 9.0 | 9.0 |
| Powder in primer layer | | | | |
| AL1[1] (wt. %) | 5 | 16 | 13 | 13 |
| Crystal structure[2] | Cor. | Cor. | Cor. | Cor. |
| Percentage of alphatization (%) | 50 | 50 | 65 | 80 |
| AL2[3] (wt. %) | 0 | 0 | 0 | 0 |
| Carbon black (wt. %) | 28 | 20 | 24 | 24 |
| Iron oxide (wt. %) | 68 | 64 | 63 | 63 |
| Linear pressure in calendering (N/cm) | 1470 | 1180 | 1470 | 1470 |
| t1[4] (μm) | 0.2 | 0.2 | 0.2 | 0.2 |
| t2[5] (μm) | 1.3 | 1.0 | 1.0 | 1.0 |
| BC[6] (μm) | 0.5 | 0.5 | 0.5 | 0.5 |
| Tape thickness (μm) | 5.6 | 5.6 | 5.6 | 5.6 |
| Coating property | A | A | A | A |
| Surface roughness (Ra) of magnetic layer (nm) | 1.8 | 2.5 | 2.8 | 2.8 |
| Ratio of Young' modulus[7] (%) | 11.0 | 12.5 | 12.2 | 12.5 |
| | 83 | 94 | 93 | 94 |
| Edge weave (μm) | 2.0 | 2.5 | 2.3 | 2.5 |
| Flatness (dB) | 1.4 | 1.9 | 1.7 | 1.8 |
| Output AVR (%) | 98 | 92 | 94 | 90 |

| Example No. | 9 | 10 | 11 | 12 |
|---|---|---|---|---|
| Support | Aramid | Aramid | Aramid | Aramid |
| Thickness (μm) | 3.9 | 3.9 | 3.9 | 3.9 |
| $Y_{MD}$ (GPa) | 11.0 | 11.0 | 11.0 | 11.0 |
| $Y_{TD}$ (GPa) | 16.4 | 16.4 | 16.4 | 15.5 |
| $Y_{MD}/Y_{TD}$ | 0.67 | 0.67 | 0.67 | 0.70 |
| $(Y_{MD} + Y_{TD})/2$ (GPa) | 13.7 | 13.7 | 13.7 | 13.3 |
| Support Ra (nm) | 9.0 | 9.0 | 9.0 | 11.0 |
| Powder in primer layer | | | | |
| AL1[1] (wt. %) | 13 | 13 | 13 | 20 |
| Crystal structure[2] | Cor. | Mix. | Cor. | Cor. |
| Percentage of alphatization (%) | 30 | 0 | 99 | 50 |
| AL2[3] (wt. %) | 0 | 0 | 0 | 0 |
| Carbon black (wt. %) | 24 | 24 | 24 | 24 |
| Iron oxide (wt. %) | 63 | 63 | 63 | 56 |
| Linear pressure in calendering (N/cm) | 1470 | 1960 | 1470 | 1470 |
| t1[4] (μm) | 0.2 | 0.2 | 0.2 | 0.2 |
| t2[5] (μm) | 1.3 | 1.0 | 1.0 | 1.0 |
| BC[6] (μm) | 0.5 | 0.5 | 0.5 | 0.5 |
| Tape thickness (μm) | 5.6 | 5.6 | 5.6 | 5.6 |
| Coating property | A | A | A | A |
| Surface roughness (Ra) of magnetic layer (nm) | 2.5 | 2.2 | 2.7 | 3.0 |
| Ratio of Young' modulus[7] (%) | 11.5 | 12.3 | 12.5 | 12.6 |
| | 84 | 90 | 91 | 95 |
| Edge weave (μm) | 2.9 | 3.2 | 2.6 | 2.3 |
| Flatness (dB) | 1.4 | 2.0 | 1.7 | 1.4 |
| Output AVR (%) | 79 | 74 | 88 | 86 |

| Example No. | 13 | 14 |
|---|---|---|
| Support | Aramid | Aramid |
| Thickness (μm) | 3.9 | 3.9 |
| $Y_{MD}$ (GPa) | 9.5 | 11.0 |
| $Y_{TD}$ (GPa) | 15.5 | 15.5 |
| $Y_{MD}/Y_{TD}$ | 0.61 | 0.70 |
| $(Y_{MD} + Y_{TD})/2$ (GPa) | 12.5 | 13.3 |
| Support Ra (nm) | 6.0 | 6.0 |
| Powder in primer layer | | |
| AL1[1] (wt. %) | 8 | 8 |
| Crystal structure[2] | Cor. | Cor. |
| Percentage of alphatization (%) | 50 | 50 |
| AL2[3] (wt. %) | 0 | 0 |
| Carbon black (wt. %) | 24 | 24 |
| Iron oxide (wt. %) | 68 | 68 |
| Linear pressure in calendering (N/cm) | 1470 | 2940 |
| t1[4] (μm) | 0.2 | 0.2 |
| t2[5] (μm) | 1.0 | 1.0 |
| BC[6] (μm) | 0.5 | 0.5 |
| Tape thickness (μm) | 5.6 | 5.6 |
| Coating property | A | A |
| Surface roughness (Ra) of magnetic layer (nm) | 2.2 | 1.8 |
| Ratio of Young' modulus[7] (%) | 11.0 | 13.8 |
| | 88 | 104 |
| Edge weave (μm) | 2.0 | 2.3 |
| Flatness (dB) | 2.8 | 3.0 |
| Output AVR (%) | 78 | 72 |

Notes:
[1] α-Alumina having a particle size of 0.07 μm.
[2] Crystal structure: Cor.: Corundum, Mix.: Mixture
[3] α-Alumina having a particle size of 0.19 μm (Percentage of alphatization: 99%)
[4] Thickness of a magnetic layer
[5] Thickness of a primer layer
[6] Thickness of a back coat layer
[7] (Young's modulus of coated layers) × 100/[$(Y_{MD} + Y_{TD})/2$]

TABLE 2

| Example No. | 15 | 16 | 17 |
|---|---|---|---|
| Support | Aramid | Aramid | Aramid |
| Thickness (μm) | 3.9 | 3.9 | 3.3 |
| $Y_{MD}$ (GPa) | 11.0 | 11.0 | 11.0 |
| $Y_{TD}$ (GPa) | 15.5 | 15.5 | 15.5 |
| $Y_{MD}/Y_{TD}$ | 0.70 | 0.70 | 0.70 |
| $(Y_{MD} + Y_{TD})/2$ (GPa) | 13.3 | 13.3 | 13.3 |
| Support Ra (nm) | 1.0 | 6.0 | 6.0 |
| Powder in primer layer | | | |
| AL1[1] (wt. %) | 8 | 0 | 8 |
| Crystal structure[2] | Cor. | — | Cor. |
| Percentage of alphatization (%) | 50 | — | 80 |
| AL2[3] (wt. %) | 0 | 8 | 0 |
| Carbon black (wt. %) | 28 | 24 | 24 |
| Iron oxide (wt. %) | 68 | 68 | 68 |
| Linear pressure in calendering (N/cm) | 1470 | 1470 | 1470 |
| t1[4] (μm) | 0.2 | 0.2 | 0.2 |
| t2[5] (μm) | 1.0 | 1.0 | 3.0 |
| BC[6] (μm) | 0.5 | 0.5 | 0.5 |
| Tape thickness (μm) | 5.6 | 5.6 | 7.4 |
| Coating property | D | B | A |
| Surface roughness (Ra) of magnetic layer (nm) | 1.5 | 3.0 | 2.8 |
| Ratio of Young' modulus[7] (%) | 11.0 | 12.0 | 11.0 |
| | 83 | 90 | 76 |

TABLE 2-continued

| Example No. | 15 | 16 | 17 |
|---|---|---|---|
| Edge weave (μm) | 2.5 | 4.3 | 2.0 |
| Flatness (dB) | 2.2 | 2.5 | 1.2 |
| Output AVR (%) | 98 | 65 | 99 |
| Remarks | | | 8) |

Notes:
1) to 7) See the Notes 1) to 7) for Table 1.
8) The tape having the specified length could not be installed in the cassette.

As can be seen from the results of Examples 1–14 and Examples 15–17 reported in Tables 1 and 2, when the non-magnetic support having low surface flatness on the surface to carry the primer and magnetic layers, which is cheap and achieves a high productivity of magnetic tapes, is used, the fluctuation of the output due to the edge weave is suppressed, and also the fluctuation (flatness) of the output from the entrance to the exit of a track is suppressed according to the present invention in which the primer layer has a thickness of 1.5 μm or less and contains 2 to 30wt. %, based on all the inorganic powder, of an alumina having a particle size of 0.1 μm or less, in particular, alumina comprising one having the corundum phase, the thickness of the non-magnetic support is from 2 to 5 μm, the Young's modulus in the machine direction of the support is at least 9.8 GPa (1,000 kg/mm²) and the ratio of the Young's modulus in the machine direction to that in the transverse direction of the support is from 0.65 to 0.75.

Furthermore, when the Young's modulus of the coated layers consisting of the primer and magnetic layers is from 40 to 100% of that of the non-magnetic support, the fluctuation (flatness) of the output from the entrance to the exit of a track is further suppressed.

What is claimed is:

1. A magnetic recording medium comprising:
    a non-magnetic support;
    at least one primer layer on one surface of said non-magnetic support;
    a magnetic layer on said primer layer; and
    a back coat layer on the other surface of said non-magnetic support, wherein said non-magnetic support has a thickness of 2 to 5 μm, the surface roughness (Ra) of said non-magnetic support on the surface carrying said primer layer and said magnetic layer is from 2.5 nm to 9 nm, the thickness of said primer layer is 1.5 μm or less, and said primer layer contains 2 to 30% by weight, based on the weight of all inorganic powder in said primer layer, of alumina powder having a particle size of 0.01 μm to 0.1 μm.

2. The magnetic recording medium according to claim 1 wherein said alumina in said primer layer comprises alumina having a corundum phase.

3. The magnetic recording medium according to claim 1, wherein a Young's modulus in a machine direction of said non-magnetic support is at least 9.8 GPa (1,000 kg/mm²) and a ratio of Young's modulus in a machine direction to that in a transverse direction of said non-magnetic support is in the range between 0.65 and 0.75.

4. The magnetic recording medium according to claim 1, wherein said primer layer further contains 15 to 40% by weight of carbon black having a particle size of 10 to 100 nm and 35 to 83% by weight of non-magnetic iron oxide having a particle size of 0.05 to 0.20 μm, based on the weight of all the inorganic powder in the primer layer.

5. The magnetic recording medium according to claim 1, wherein a Young's modulus of a coated layer consisting of said primer layer and said magnetic layer is in a range between 40 and 100% of an average value of Young's moduli in machine and transverse directions of said non-magnetic support.

6. The magnetic recording medium according to claim 1, wherein said non-magnetic support has a thickness of 2.5 to 4.5 μm and a surface roughness (Ra) of 3 to 9 nm on its surface carrying said primer layer and said magnetic layer, said primer layer has a thickness of 0.3 to 1.5 μm, said magnetic layer has a thickness of 0.02 to 0.3 μm, a coercive force of 135 to 280 kA/m and a residual magnetic flux density of at least 0.18 T in the machine direction, and said back coat layer has a thickness of 0.2 to 0.8 μm.

7. A magnetic recording medium comprising:
    a non-magnetic support having a ratio of Young's modulus in a machine direction to Young's modulus in a traverse direction from 0.65 to 0.75;
    a primer layer on a first surface of the support, said primer layer containing carbon black and at least one non-magnetic metal oxide selected from the group consisting of alumina and iron oxide; and
    a magnetic layer on the primer layer,
    wherein said magnetic recording medium has an edge weave of 3.2 μm or less.

8. The magnetic recording medium of claim 7 further comprising:
    a back coat layer on a second surface of the non-magnetic support.

9. The magnetic recording medium of claim 7, wherein the non-magnetic support has a Young's modulus in the machine direction of at least 9.8 Gpa (1,000 kg/mm²).

10. The magnetic recording medium of claim 7, wherein the non-magnetic support has a surface roughness on the first surface of 2.5 nm to 9 nm.

11. The magnetic recording medium of claim 7, wherein the primer layer comprises alumina powder with a particle size of 0.01 μm to 0.1 μm.

12. The magnetic recording medium of claim 7, wherein the primer layer comprises alumina powder and has a thickness of 1.5 μm or less.

13. The magnetic recording medium of claim 7, wherein the primer layer comprises 2 to 30% by weight of alumina powder based on a weight of all inorganic powder in the primer layer.

* * * * *